Figure 1:
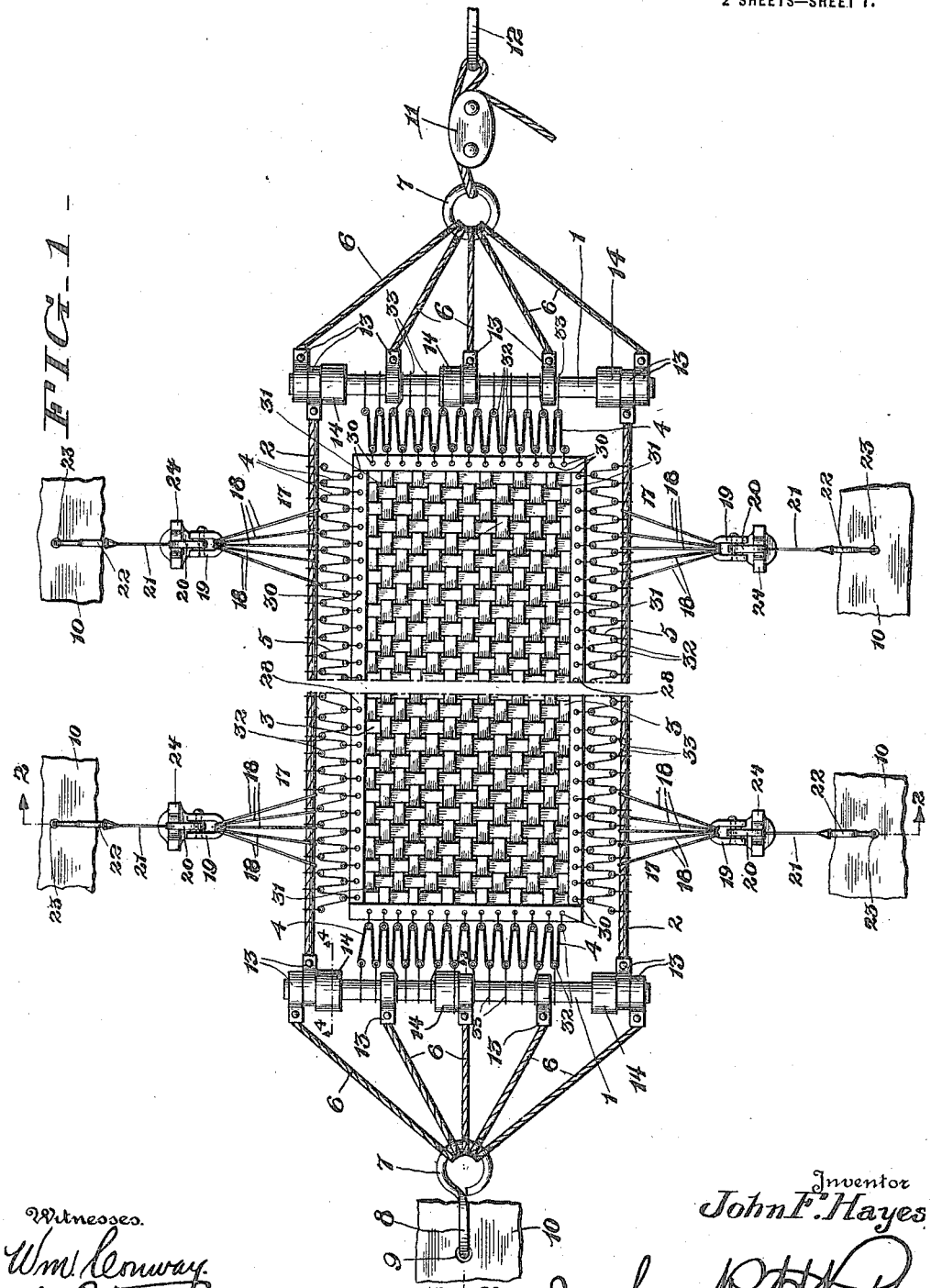

J. F. HAYES.
GYMNASTIC APPARATUS.
APPLICATION FILED OCT. 11, 1915.

1,188,071.

Patented June 20, 1916.
2 SHEETS—SHEET 1.

Witnesses.
Wm Conway.
C. R. Ziegler.

Inventor
John F. Hayes
By Joshua R. H. Potts.
his Attorney

J. F. HAYES.
GYMNASTIC APPARATUS.
APPLICATION FILED OCT. 11, 1915.
1,188,071.
Patented June 20, 1916.
2 SHEETS—SHEET 2.
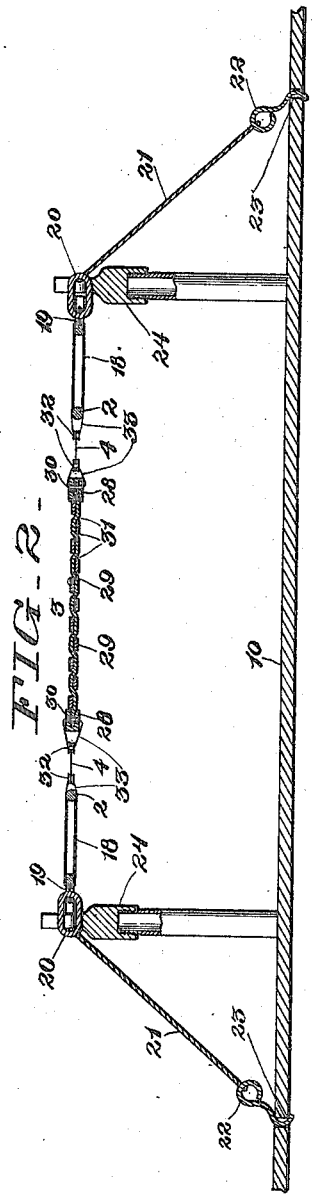
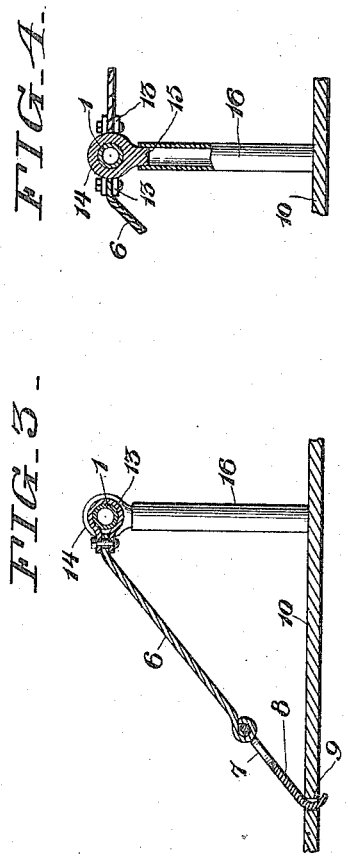
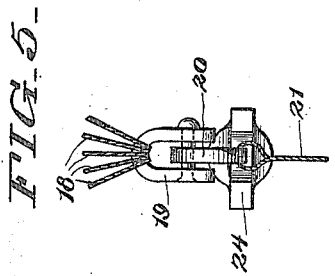
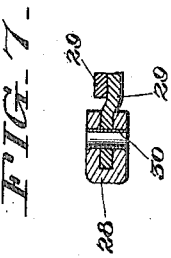
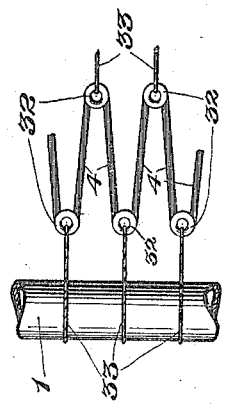
Witnesses
Wm. Conway.
C. R. Ziegler.
Inventor
John F. Hayes,
By Joshua R. H. Potts.
his Attorney

UNITED STATES PATENT OFFICE.

JOHN F. HAYES, OF HILLSDALE, NEW JERSEY.

GYMNASTIC APPARATUS.

1,188,071.  Specification of Letters Patent.  Patented June 20, 1916.

Application filed October 11, 1915. Serial No. 55,240.

*To all whom it may concern:*

Be it known that I, JOHN F. HAYES, a citizen of the United States, residing at Hillsdale, in the county of Bergen and State of New Jersey, have invented certain new and useful Improvements in Gymnastic Apparatus, of which the following is a specification.

My invention relates to improvements in gymnastic apparatus, the object of the invention being to provide an improved construction of bounding mat on which the gymnast bounces up and down and performs many gymnastic feats.

My improved apparatus is designed primarily as an amusement device on which many performers in succession attempt various feats of turning and somersaulting in competition, yet of course, the invention is capable of a wide range of use in this art.

With these and other objects in view, the invention consists in certain novel features of construction and combination and arrangements of parts as will be more fully hereinafter described and pointed out in the claims.

In the accompanying drawings: Figure 1 is a broken plan view illustrating my improvements. Fig. 2 is a view in transverse section on the line 2—2 of Fig. 1. Fig. 3 is a fragmentary view in longitudinal section on the line 3—3 of Fig. 1. Fig. 4 is a fragmentary view in section on the line 4—4 of Fig. 1. Fig. 5 is an enlarged fragmentary plan view illustrating one of the shackles 19 and its coöperating parts. Fig. 6 is an enlarged fragmentary plan view illustrating the manner of connecting the elastic, and Fig. 7 is an enlarged view in section through the border of the mat.

My improved apparatus is provided at its ends with parallel tubular rods 1, 1, which are connected at their ends by cables 2. These tubular rods 1 and cables 2 constitute an elongated rectangular frame in the center of which is supported my improved mat 3 which is connected to the rods 1 and cables 2 by elastic cords 4 and 5 as will be more fully hereinafter described. The rods 1 are connected by cables 6 with rings 7. One of these rings constituting a portion of the hook 8, projects through the opening 9 in the floor 10, while the other ring 7 is connected by a block and tackle 11 with a hook 12 also adapted to be secured in the floor like the hook 8. The cables 2 and the cables 6 are preferably connected to the rods 1 by clamps 13, and collars 14 positioned around the tubes 1 are provided with lugs 15 which project into the upper ends of tubular posts 16 which support the rods 1 at the desired elevation. The cables 2 are provided with any desired number of lateral supports 17, although I have shown but four in the drawing. Each lateral support 17 comprises a plurality of cables 18 secured to the cable 2 at one end, and at their other ends connected to a shackle 19. This shackle 19 is connected to a link 20 or other similar coupling device on the end of a cable 21, and a hook 22 at the free end of cable 21 is projected through an opening 23 in the floor 10. Forked posts 24 hold these lateral supports 17 at an elevation as shown clearly in Fig. 2. These posts 24 are preferably spaced a distance from the sides of the mat, and hold the lateral supports at a point adjacent the shackles 19.

My improved mat 3 above referred to comprises an outer border 28, preferably of heavy canvas which is folded longitudinally, and which incloses and is secured to the ends of interlaced strips 29. These strips 29 are also preferably of strong heavy canvas, and a convenient means of securing them is to project eyelets 30 through the border 28, and the ends of the strips.

It is to be understood that the canvas strips 29 are closely laced, so that but relatively small openings 31 are provided between the strips. These openings are, however, of a sufficient size to allow a free passage of the air, and prevent any holding of the mat due to the suction or pressure of air.

The elastic cords 4 above referred to which connect the ends of the mat with the rods 1, are preferably of rubber, and are provided with eyes 32 connected by cords 33 with the rods 1 and mat 3. The eyelets 30 above referred to afford a convenient means of attaching the cords 33 which are projected through the eyes 32, and eyelets 30, as clearly shown in Fig. 1.

The elastic cords 5 are precisely like cords 4 except that they are smaller in diameter as they are not subjected to the same strain as the cords 4, or in other words more equally distribute the strain and stress throughout the length of the apparatus, and give a maximum of elasticity to the mat.

By providing continuous elastic cords supporting the four sides of the mat, I give a uniform elasticity throughout, and the performer will receive a full elastic cushion or rebound effect when dropping on any part of the mat.

In operation, the apparatus is positioned as shown and the several performers step on top of the mat 3, and bounce thereon, performing various feats either for exhibition or competition, and the elasticity of the cords 4 and 5 cause the mat 3 to move up and down and cushion the fall of the performer, and also cause him to rebound into the air.

As above stated, the mat is composed of interlaced strips which allow the air to flow freely between them, and hence the elasticity is not interfered with by the suction or pressure of air, and the apparatus is therefore capable of a use which would not be possible unless this passage of air was provided for.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus of the character described, the combination with a taut frame comprising side and end members secured together, of a mat located within and spaced from the frame, elastic cords having eyes secured at various points throughout their length, said cords located between the sides and ends of the mat and sides and ends of the frame, and flexible devices connecting said eyes with the frame and mat respectively, whereby the cords are held in a serrated formation, substantially as described.

2. In an apparatus of the character described, the combination with a taut frame comprising side and end members secured together, of a mat located within and spaced from the frame, said mat comprising border strips with interlaced longitudinal and transverse strips secured to the border strip, eyelets in the border strips securing the laced strips thereto, elastic devices between the ends and sides of the mat and ends and sides of the frame, flexible devices connecting said elastic devices with the frame, and other flexible devices connecting said elastic devices with the eyelets of the mat, substantially as described.

3. In an apparatus of the character described, the combination with a taut frame comprising side and end members secured together, of a mat located within and spaced from the frame, elastic cords having eyes secured at various points throughout their length, said cords located between the sides and ends of the mat and sides and ends of the frame, flexible devices connecting said eyes with the frame and mat respectively, whereby the cords are held in a serrated formation, a plurality of hooks adapted to be connected to the floor, a plurality of flexible devices connecting the sides and ends of the frame and secured to said hooks, removable posts supporting the end rods, and removable posts supporting the lateral flexible devices, substantially as described.

4. In an apparatus of the character described, the combination with a taut frame comprising side and end members secured together, of a mat located within and spaced from the frame, said mat comprising border strips with interlaced longitudinal and transverse strips secured to the border strip, eyelets in the border strips securing the laced strips thereto, elastic devices between the ends and sides of the mat and ends and sides of the frame, flexible devices connecting said elastic devices with the frame, other flexible devices connecting said elastic devices with the eyelets of the mat, a plurality of hooks adapted to be connected to the floor, a plurality of flexible devices connecting the sides and ends of the frame and secured to said hooks, removable posts supporting the end rods, and removable posts supporting the lateral flexible devices, substantially as described.

In testimony whereof I have signed my name to this specification in the presence of two subscribing witnesses.

JOHN F. HAYES.

Witnesses:
HARVEY FRITZ,
WALTER LAMSON.

Copies of this patent may be obtained for five cents each, by addressing the "Commissioner of Patents, Washington, D. C."